April 8, 1924.

G. T. JACOCKS 1,489,640

JOINT BETWEEN PIPES AND FLANGES

Filed Feb. 18, 1922

Inventor
George T Jacocks

By T. Clay Lindsey.
His Attorney

Patented Apr. 8, 1924.

1,489,640

UNITED STATES PATENT OFFICE.

GEORGE T. JACOCKS, OF WEST HARTFORD, CONNECTICUT, ASSIGNOR TO THE WHITLOCK COIL PIPE COMPANY, OF WEST HARTFORD, CONNECTICUT, A CORPORATION OF CONNECTICUT.

JOINT BETWEEN PIPES AND FLANGES.

Application filed February 18, 1922. Serial No. 537,441.

*To all whom it may concern:*

Be it known that I, GEORGE T. JACOCKS, a citizen of the United States, and a resident of West Hartford, county of Hartford, State of Connecticut, have invented certain new and useful Improvements in Joints Between Pipes and Flanges, of which the following is a specification.

This invention relates, generally, to the joining of metallic pipes to relatively heavier metallic bodies, for instance plates or flanges such as are used in making a connection between a pair of pipes. Various expedients have been employed to connect pipes to flanges, one usual practice being to telescope the pipe member into the flange and connect them together in this relation as by means of screw threads. These old practices are open to various objections, and particularly they are more or less expensive to carry out while they do not always result in a perfectly tight union between the pipe and the flange or plate member.

It is, of course, common practice to abut the ends of a pair of pipes of substantially the same diameters and weld them together by means of an electric current, but this method, as heretofore practiced, has never been of advantage for connecting a pipe to a heavy plate or flange, the reason probably being that the flange absorbed and then radiated so much of the heat generated by the electric current that there was not sufficient heat conducted to and retained at the joint to properly weld the metal at the joint.

In accordance with the present invention, I provide an improved process for electrically welding, by means of the resistance method, a pipe to a flange which is preferably drop forged, the method being such that it may be very easily and economically carried out and result in a perfect union of great strength and stiffness between the pipe and the plate. By proceeding in accordance with the present invention, the heat generated by the electric current is localized and retained at the joint or point of weld, and the absorption of heat and its radiation by the flange is obviated, thus insuring that the metal of the pipe and flange at the point of contact is heated to such temperature that the metal will melt and flow together, thus uniting the pipe and flange into an integral whole. The invention also resides in the apparatus or device employed for carrying out the method.

Figure 1:
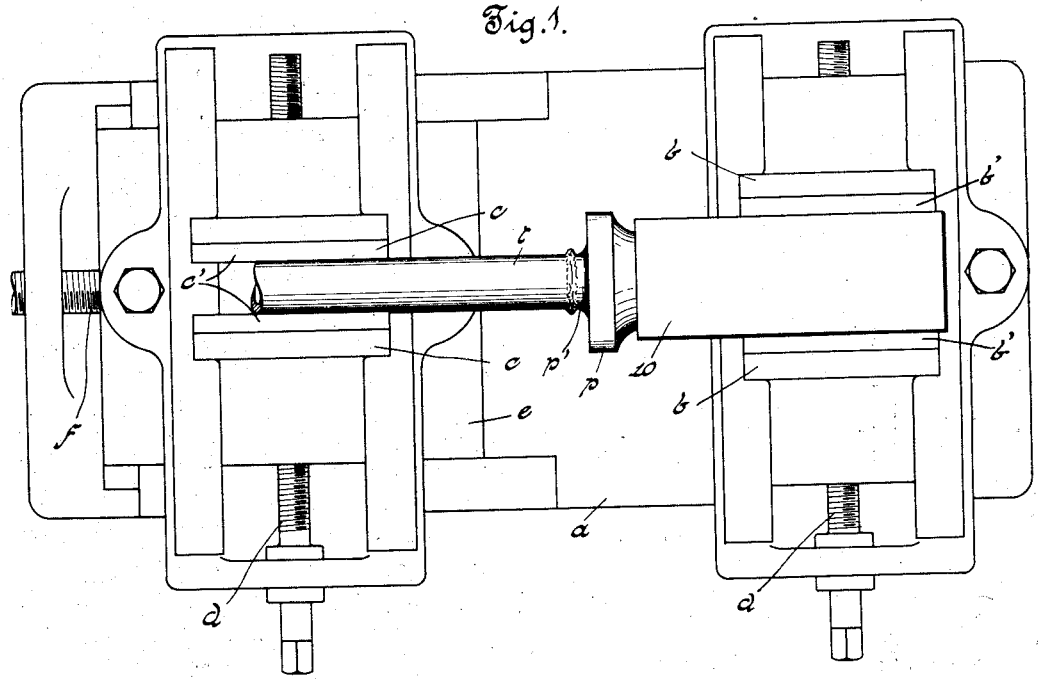
Figure 2:
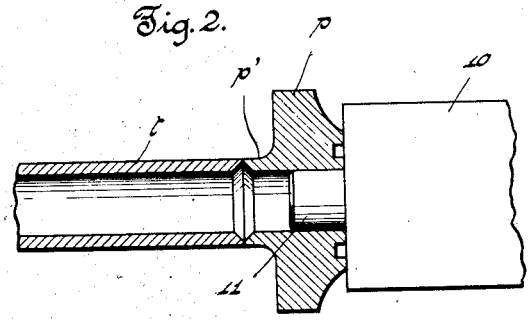
Figure 3:
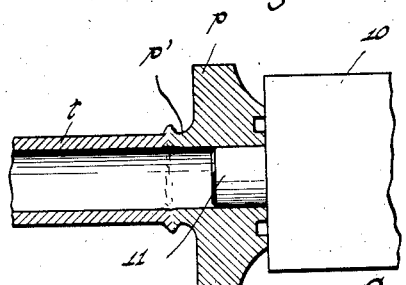

In the accompanying drawing, wherein I have shown for illustrative purposes one embodiment which the invention may take, Fig. 1 is a top plan view of an apparatus for carrying out the invention;

Fig. 2 is a view showing the flange and pipe in abutting relation before the weld is made and with my improved holder or electrode properly positioned relative to the flange; and Fig. 3 is a view similar to Fig. 2, but shows the weld completed.

Referring to the drawing in detail, I have shown, in Fig. 1, an apparatus of a well-known type which is now commonly employed for welding operations. This apparatus is shown solely for the purpose of illustrating one application of the present invention, it being understood that my improved method may be carried out by means of apparatus of other types than that here disclosed. This old apparatus or device comprises, generally, a base $a$ and two pairs of jaws $b$ and $c$, one jaw of each pair being adjustable relative to the other jaw; in the present instance, this adjustment being brought about by screws $d$. The jaws $c$ are carried by a slide $e$ which is adapted to be moved relative to the other pair of jaws, as by means of a lead screw $f$ so as to force together the parts to be connected during the welding operation. It has been customary in welding together the abutting ends of a pair of similar pipes to clamp one pipe between one pair of jaws and the other pipe between the other pair of jaws and then force the pairs of jaws towards each other during the welding operation. This practice, as previously stated, is not applicable to use in welding a flange and a pipe.

In the drawing, the flange member or plate is designated by the letter $p$ and the pipe or tube to be welded to this flange member is indicated by the letter $t$. The flange is a relatively heavy piece or plate of metal having a bore and a short collar $p'$ of substantially the same size as the pipe $t$. This flange member is preferably drop forged to the shape shown, which means that it may be economically manufactured and possesses great strength. The abutting ends of the pipe *t* and the collar *p'* are preferably chamfered as shown in Fig. 2.

In accordance with the method of the present invention, the welding operation is carried out in such manner that the flow of electricity (instead of being from the external periphery of the flange and through the flange to the joint) is through the metal of the flange immediately about the bore thereof and directly to the line of contact between the pipe and the collar *p'*, thus insuring that the heat will be localized at the point of weld just where it is needed. To bring about this result, I provide a holder or electrode, preferably in the form of a copper block having a body portion 10 of rectangular shape and an integral stud 11 at one end, as illustrated in the drawing. The body portion of the holder is adapted to be clamped between one pair of jaws. It is, of course, understood that the active face members *c'*, *b'*, of the jaws form electrodes. During the welding operation, the flange member is supported on the projection or stud 11 and its end face engages against the forward end of the body portion 10 of the holder; the pipe member *t* is clamped between the other pair of jaws, and the pairs of jaws are forced towards each other, as by means of the lead screw *f*, so as to press the end of the pipe against the collar *p'* while the current is flowing through the stud 11, the wall of the bore of the flange, the joint, and the pipe *t* to the electrode *c'*. Of course, the current may be passed in the other direction, that is from the electrodes *c'* to my improved electrode or holder supporting the flange member. I have found that by using the holder of the present invention, the metal of the pipe and flange where the joint is to be formed is brought to a high heat due to the resistance at this joint, and that a perfect union between the pipe and flange is very economically and effectively obtained.

It is, of course, obvious that my invention is susceptible of various modifications and changes which are within the spirit of the invention without departing from the scope of the following claims; it being understood that the present disclosure of my invention is by way of illustration only and it is not to be taken as restrictive of my conception.

I claim as my invention:—

1. The herein described method of uniting a pipe to the collar of a flange or plate, which consists in abutting the ends of the collar and pipe, passing an electric current into the wall of said bore intermediate its ends and along said wall to the joint and through said joint and pipe, and forcing said flange and pipe towards one another during the welding operation.

2. An apparatus for use in welding a pipe to a flange having a collar, said apparatus including an electrode having a body portion abutting the end of said flange and a stud projecting from said body portion and adapted to protrude into and fit closely in the bore of said flange, a pair of electrodes gripping said pipe, and means for forcing the pipe and collar towards one another during the welding operation.

GEORGE T. JACOCKS.